United States Patent
Yuh et al.

(10) Patent No.: US 9,699,872 B2
(45) Date of Patent: Jul. 4, 2017

(54) CONTROL SYSTEM AND METHOD FOR WIRELESSLY SWITCHING LAMPS OVER SHORT DISTANCES

(71) Applicant: LUXUL TECHNOLOGY INCORPORATION, New Taipei (TW)

(72) Inventors: Perng-Fei Yuh, New Taipei (TW); Shiun-Shang Chan, New Taipei (TW); Cheng-Hung Pan, New Taipei (TW)

(73) Assignee: LUXUL TECHNOLOCY INCORPORATION, New Taipei (TW)

( * ) Notice: Subject to any disclaimer, the term of this patent is extended or adjusted under 35 U.S.C. 154(b) by 0 days.

(21) Appl. No.: 14/981,619

(22) Filed: Dec. 28, 2015

(65) Prior Publication Data

US 2017/0118824 A1    Apr. 27, 2017

(30) Foreign Application Priority Data

Oct. 27, 2015 (TW) .............................. 104135193 A (51) Int. Cl.
*H05B 37/02* (2006.01)
(52) U.S. Cl.
CPC ................................ *H05B 37/0272* (2013.01)
(58) Field of Classification Search
CPC ............ H05B 37/0272; H05B 37/0227; H05B 37/0245
USPC ........................................................ 315/297
See application file for complete search history.

(56) References Cited

U.S. PATENT DOCUMENTS

| | | | | |
|---|---|---|---|---|
| 7,369,060 | B2 * | 5/2008 | Veskovic | H05B 37/0254 340/12.52 |
| 2010/0141153 | A1 * | 6/2010 | Recker | H05B 33/0803 315/149 |
| 2010/0171430 | A1 * | 7/2010 | Seydoux | H05B 37/0272 315/159 |
| 2010/0244746 | A1 * | 9/2010 | Van De Sluis | H05B 37/0272 315/312 |
| 2012/0169249 | A1 * | 7/2012 | Loveland | H05B 37/0245 315/291 |
| 2013/0026945 | A1 * | 1/2013 | Ganick | H05B 37/0272 315/246 |
| 2013/0300314 | A1 * | 11/2013 | Weda | H04B 10/1149 315/291 |

(Continued)

*Primary Examiner* — Don Le
(74) *Attorney, Agent, or Firm* — Lynette Wylie; Apex Juris, pllc (57) ABSTRACT

A control system for wirelessly switching lamps over short distances includes a mobile device, a lamp control switch and a controlled lamp. A user holds the mobile device to approach or depart from the lamp control switch and continuously transmit a wireless signal according to a communication protocol. The lamp control switch receives the wireless signal according to the communication protocol and turns on or off a corresponding controlled lamp according to signal intensity of the wireless signal. The control system is operated when users travel among different environments. When users get close to the lamp control switch, the lamp control switch drives the controlled lamp to turn on or off, and when users depart from the lamp control switch, the lamp control switch automatically turns off the controlled lamp, thereby ensuring operational convenience, energy conservation and carbon reduction.

14 Claims, 6 Drawing Sheets

(56) References Cited

U.S. PATENT DOCUMENTS

| | | | |
|---|---|---|---|
| 2014/0103819 A1* | 4/2014 | Mohan | H05B 37/0254 |
| | | | 315/159 |
| 2014/0265920 A1* | 9/2014 | Pederson | H05B 33/0842 |
| | | | 315/294 |
| 2014/0285113 A1* | 9/2014 | Huang | H05B 37/0272 |
| | | | 315/297 |

* cited by examiner

CONTROL SYSTEM AND METHOD FOR WIRELESSLY SWITCHING LAMPS OVER SHORT DISTANCES

BACKGROUND OF THE INVENTION

1. Field of the Invention

The present invention relates to a control system and method for switching lamps and, more particularly, to a control system and method for wirelessly switching lamps over short distances.

2. Description of the Related Art

Metropolitan areas are full of high-rise buildings. Lighting is basic equipment required for each office of the buildings. Because users of offices may not be familiar with locations of lamp switches, seeking the lamp switches in the dark is often a challenge. Moreover, when users do not switch off the lights when they leave, electrical energy is wasted, resulting in a higher operation cost. Thus the problems persist resulting from inconvenience caused by manual switching operation of the lights and the energy waste caused by inadvertently leaving the lights.

The disclosure of Taiwan Patent No. 1487303 entitled "Wireless smart energy conservation two-wire lamp control switch device" (hereinafter "the conventional lamp control switch") introduces a smart wireless peripheral lighting control device for a digital home automation system, which is installed at a single gang wall switch box in a traditional two-wire manner for replacing a traditional manually controlled lamp control switch to three sets of lamp control switches. The conventional lamp control switch internally has a human motion infrared sensor, a visible light illumination sensor, a touch panel, a loading current detector, an environment temperature sensor, and a digital radio transceiving module for receiving commands of remote wireless controller, wireless broadband internet control host or mobile network control host to carry out remote switch lamp control of the lamp set loading. Also, switching lamp control can be carried out at by proximal human motion infrared sensing or touch control to replace traditional ways of mechanical switching.

Such switching motion sensors partially address problems of inconvenience and energy waste resulting from traditional manually-switched lamp control. Unfortunately, however, although the conventional lamp control switch provides multiple sensors in place of manual lamp switch operation, problems and drawbacks emanating from such sensor lamp limitations, are susceptible to environmental factors, and easily trigger false detection persist. Moreover, despite the remote control used in the conventional lamp control switch, manually pressing the buttons of the remote control still relies on users' proactive behavior, such that the energy waste caused by unintentionally leaving the lights continues. Moreover, sensor switched lamps exhibit the additional drawback of false detection of the sensors.

SUMMARY OF THE INVENTION

An objective of the present invention is to provide a control system and method for wirelessly switching lamps over short distances for lamps distributed over different environments to be automatically turned on or off according to a location of a user's mobile device for the purpose of operational convenience, reduced false detection, energy conservation and carbon reduction.

To achieve the foregoing objective, the method for wirelessly switching lamps over short distances, the method performed by a control system having a mobile device, a lamp control switch and a controlled lamp and includes steps of:

positioning the mobile device at a location proximate to the lamp control switch for a first communication module built in the mobile device to continuously transmit a wireless signal to the lamp control switch according to a communication protocol;

receiving the wireless signal through a second communication module built in the lamp control switch according to the communication protocol;

turning on or turning off the controlled lamp according to a status of the wireless signal through the lamp control switch;

determining if no wireless signal is received by the lamp control switch;

starting counting time until a wait time is reached when determining that no wireless signal is received by the lamp control switch; and turning off the controlled lamp.

According to the foregoing method, when users travel among different environments, the mobile device continuously transmits the wireless signal according to the communication protocol. When the mobile device approaches the lamp control switch, the lamp control switch receives the wireless signal according to the communication protocol and turns on or off the controlled lamp according to the status of the wireless signal. Such automatic lamp switching method ensures less impact on environments, reduced false detection, higher operation convenience, energy conservation and carbon reduction.

To achieve the foregoing objective, the control system for wirelessly switching lamps over short distances includes a mobile device, at least one lamp control switch and at least one controlled lamp.

The mobile device has a first communication module continuously transmitting a wireless signal according to a communication protocol.

Each of the at least one lamp control switch has a second communication module receiving the wireless signal according to the communication protocol and transmitting a drive signal according to a status of the wireless signal.

The at least one controlled lamp is connected to the respective lamp control switch for the respective lamp control switch to turn on or off the at least one controlled lamp according to the drive signal transmitted from the respective lamp control switch.

From the foregoing control system, the control system is driven by a user who holds the mobile device and travels among different environments. The first communication module of the mobile device continuously transmits the wireless signal according to the communication protocol. The second communication module of the lamp control switch receives the wireless signal according to the communication protocol. The lamp control switch then determines whether the user approaches or departs from the lamp control switch and transmits the drive signal to the controlled lamp according to the status of the wireless signal. The controlled lamp is turned on or off according to the drive signal transmitted from the lamp control switch. Such automatic lamp switching system ensures less impact on environments, reduced false detection, higher operation convenience, energy conservation and carbon reduction.

Other objectives, advantages and novel features of the invention will become more apparent from the following detailed description when taken in conjunction with the accompanying drawings.

DETAILED DESCRIPTION OF THE INVENTION

Figure 1:
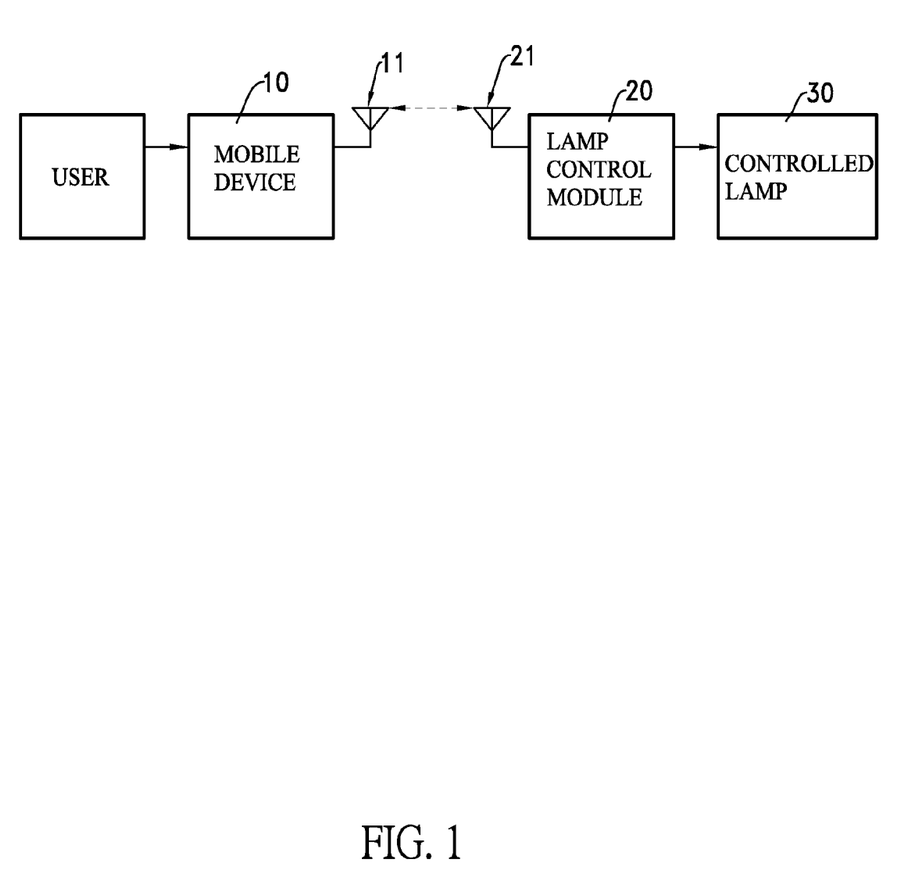
FIG. 1 is a functional block diagram of a control system for wirelessly switching lamps over short distances in accordance with the present invention.

With reference to FIG. 1, a control system for wirelessly switching lamps over short distances in accordance with the present invention includes a mobile device 10, at least one lamp control switch 20 and at least one controlled lamp 30. As to how the control system is operated, a user holds the mobile device 10 to approach or depart from each one of the at least one lamp control switch 20 for the lamp control switch 20 to turn on or off one of the at least one controlled lamp 30 in connection with the lamp control switch 20.

The mobile device 10 has a first communication module 11. The first communication module 11 is built in with a communication protocol and continuously transmits a wireless signal according to the communication protocol when the mobile device 10 is positioned proximate to one of the at least one lamp control switch 20. The lamp control switch 20 has a second communication module 21. The second communication module 21 receives the wireless signal from the first communication module 11 according to the communication protocol. The lamp control switch 20 transmits a drive signal to one of the at least one controlled lamp 30 based on the availability and signal intensity of the wireless signal. The controlled lamp 30 is turned on or off by the drive signal transmitted from the lamp control switch 20. Hence, the control system is applicable to users when holding the mobile device 10 and travelling or temporarily staying in different environments. For example, upon travelling in an office building or other spatial environment, after a user moves to a specific location of the office space on each floor or each office in the office building where the at least one lamp control switch 20 and the at least one controlled lamp 30 are installed, the user can decide to temporarily stay or leave.

Figure 2:
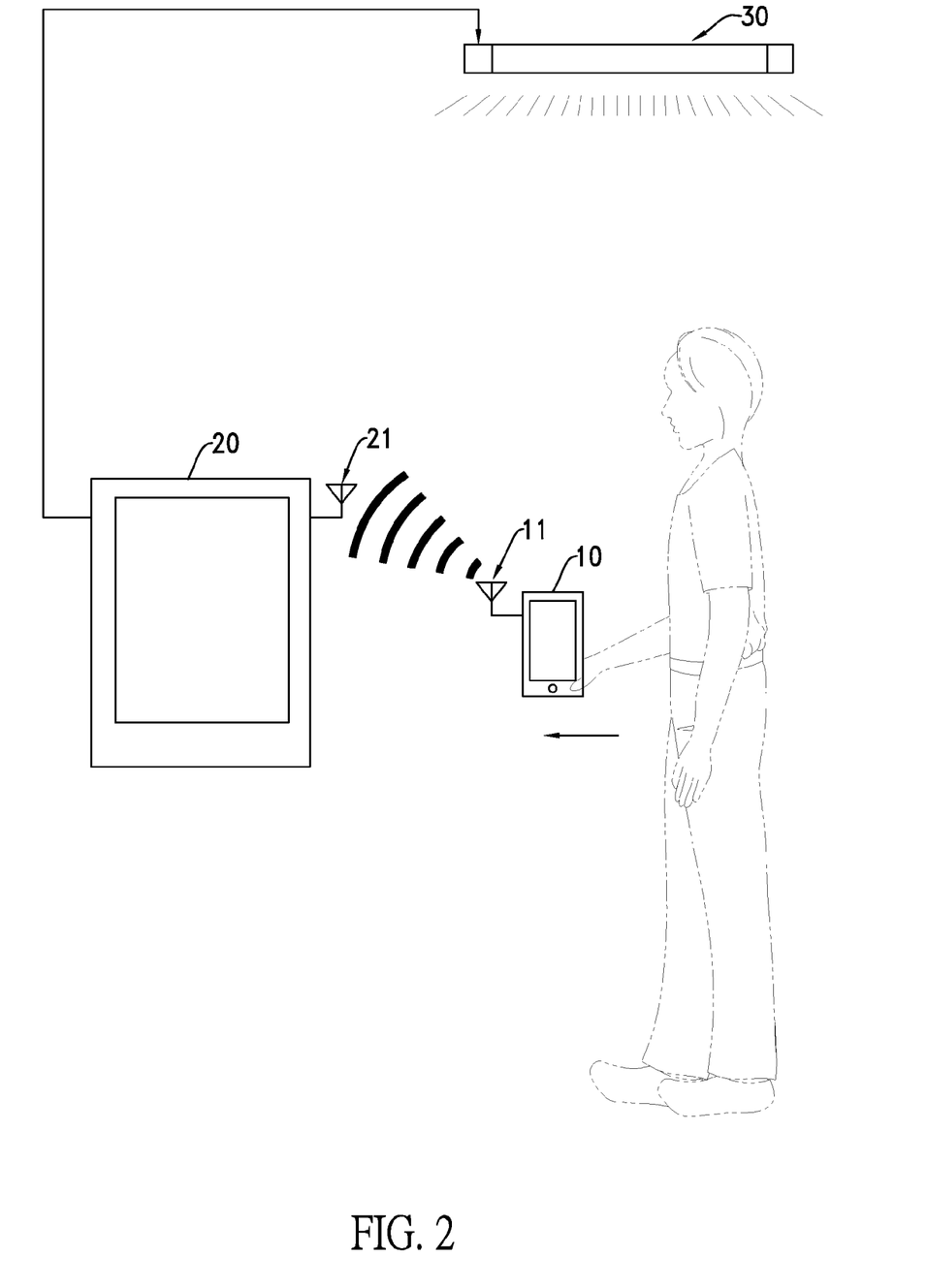
FIG. 2 is an operational schematic view of the control system in FIG. 1.
Figure 3:
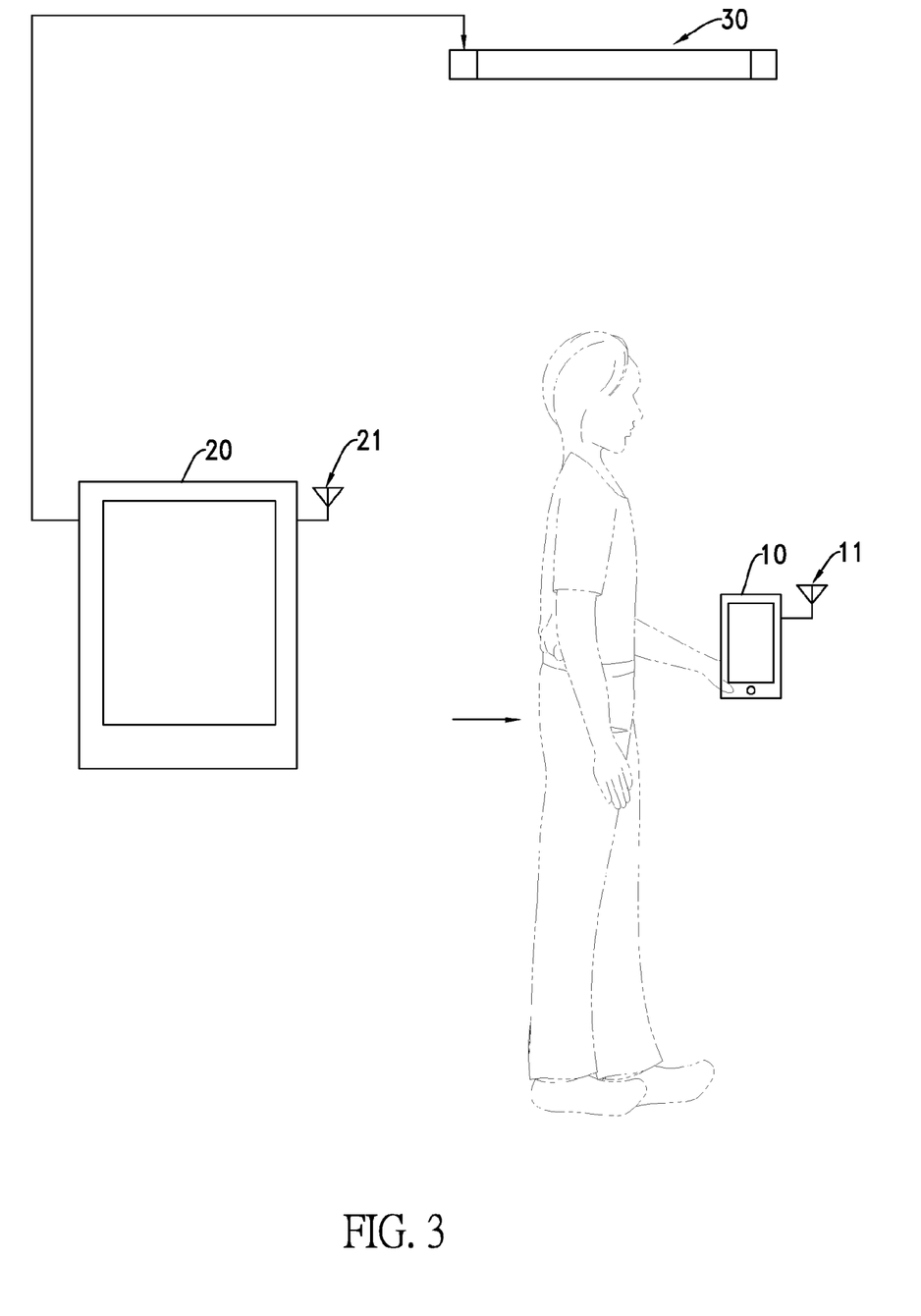
FIG. 3 is another operational schematic view of the control system in FIG. 1.

To explain operation of the foregoing embodiment, with reference to FIGS. 2 and 3, a user is moving in a spatial environment and one of the at least one lamp control switch 20 and a corresponding controlled lamp 30 are installed at a specific location or on a moving path of the user. The user holds the mobile device 10 to continuously transmit the wireless signal according to the communication protocol built in the first communication module 11. When the user passes by and approaches the lamp control switch 20 at the specific location or on the moving path of the user, the second communication module 21 of the lamp control switch 20 receives the wireless signal from the first communication module 11 through the communication protocol. The lamp control switch 20 then determines if the user is getting close or staying away from the lamp control switch 20 according to a status of the wireless signal. In the present embodiment, the first communication module 11 and the second communication module 21 are WiFi (Wireless Fidelity) modules or Bluetooth® modules, and the communication protocol is a WiFi protocol or a Bluetooth® protocol.

With further reference to FIG. 2, when the user approaches the lamp control switch 20, the lamp control switch 20 instantly drives the corresponding controlled lamp 30 to turn on according to the received wireless signal. Alternatively, when the signal intensity of the wireless signal received by the lamp control switch 20 exceeds a threshold value, the lamp control switch 20 drives the controlled lamp 30 to turn on. With further reference to FIG. 3, when the user departs from the lamp control switch 20 and the lamp control switch 20 determines that no wireless signal is received, such as signal disconnection, the lamp control switch 20 then drives the controlled lamp 30 to turn off. On the other hand, when the signal intensity of the wireless signal received by the lamp control switch 20 is less than the threshold value, the lamp control switch 20 drives the controlled lamp 30 to turn off.

Figure 4:
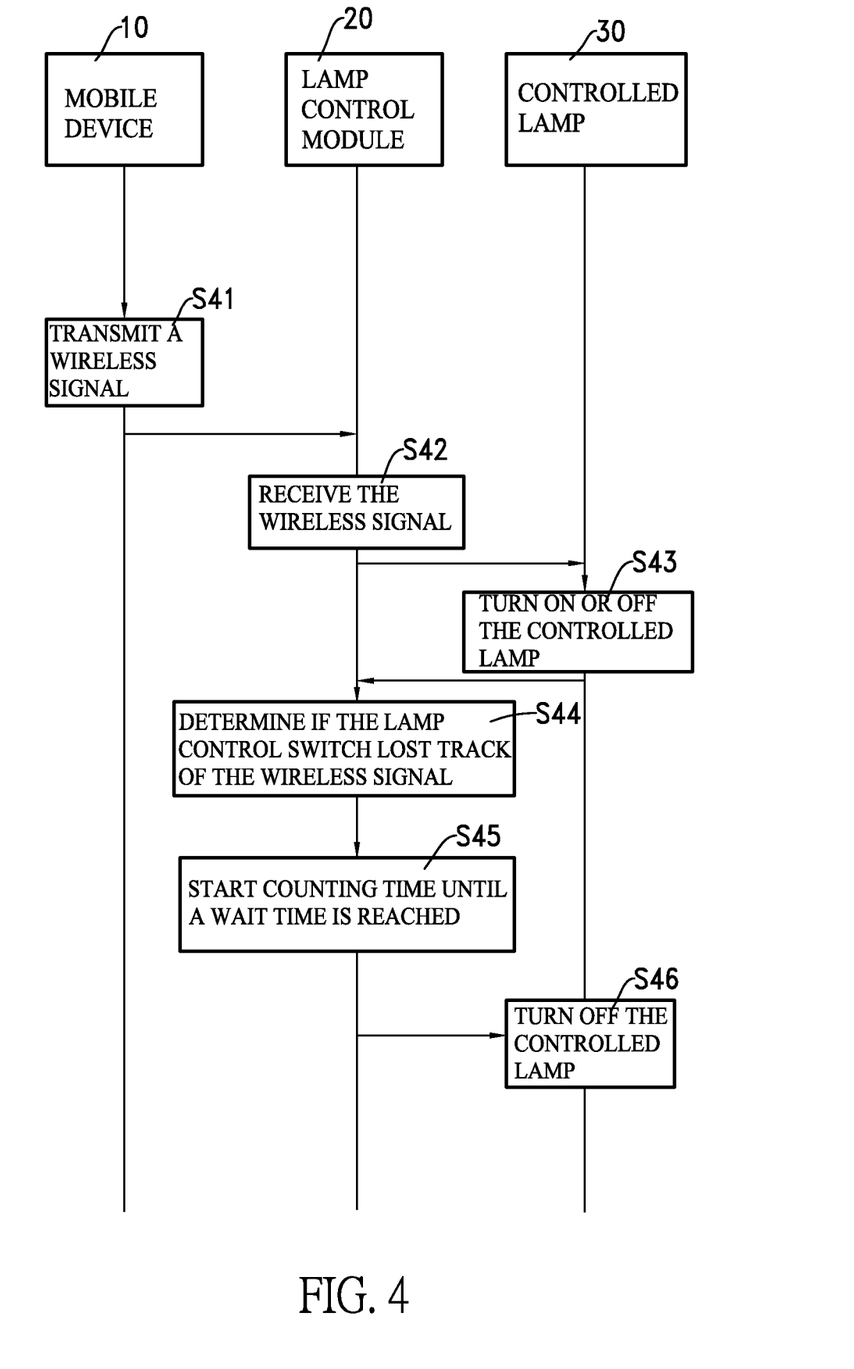
FIG. 4 is a sequence diagram illustrating tasks performed by the control system in FIG. 1.
Figure 5:
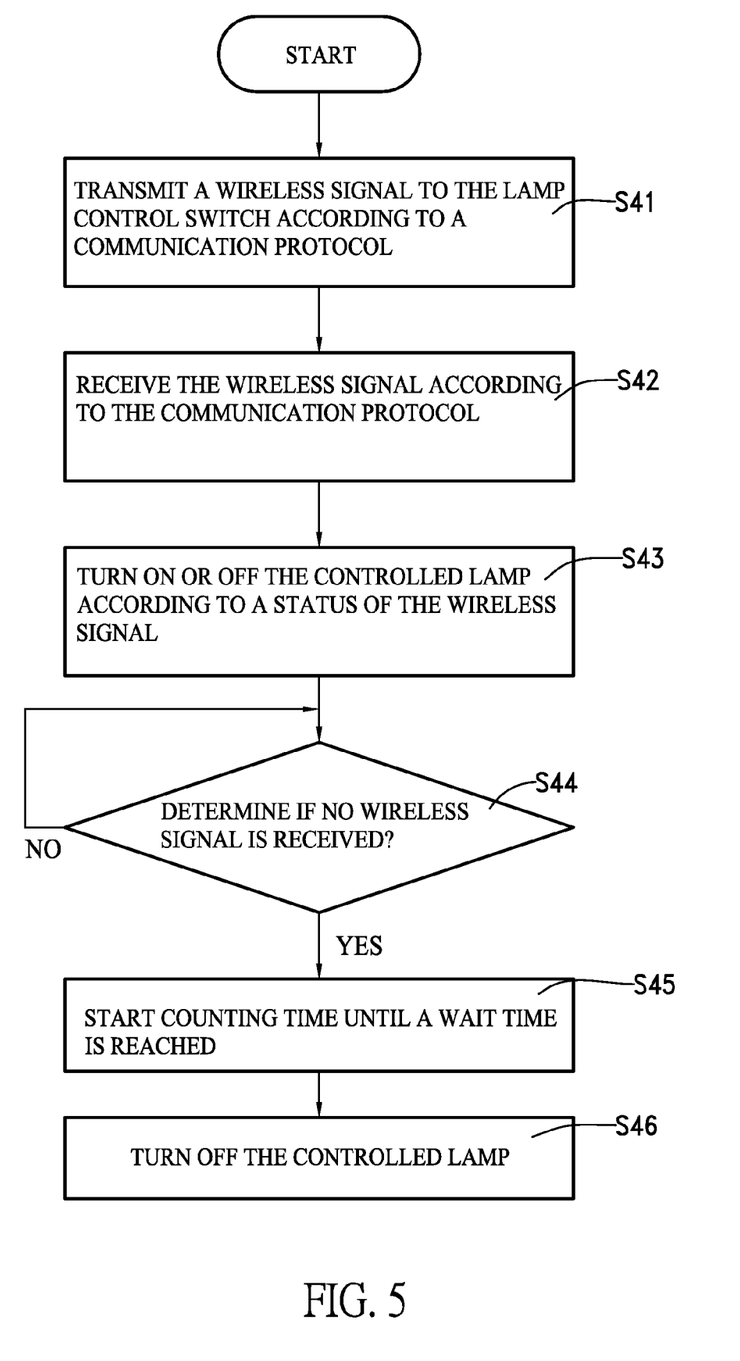
FIG. 5 is a flow diagram of a method for wirelessly switching lamps over short distances in accordance with the present invention.

In light of the foregoing embodiment and operation thereof, a method for wirelessly switching lamps over short distances can be derived. With reference to FIGS. 4 and 5, the method is performed by a control system for wirelessly switching lamps over short distances when a user holds the mobile device 10 of the control system to approach or depart from the lamp control switch 20 of the control system and includes steps of:

Step S41: Position the mobile device 10 at a location proximate to the lamp control switch 20 for the first communication module 11 built in the mobile device 10 to continuously transmit a wireless signal to the lamp control switch 20 according to the communication protocol.

Step S42: Receive the wireless signal through the second communication module 21 built in the lamp control switch 20 according to the communication protocol.

Step S43: Turn on or turn off the controlled lamp 30 according to a status of the wireless signal through the lamp control switch 20.

Step S44: Determine if no wireless signal is received by the lamp control switch 20. If the determination result is positive, perform step S45. Otherwise, resume step S44.

Step S45: Start counting time until a wait time is reached.

Step S46: Turn off the controlled lamp 30.

Figure 6:
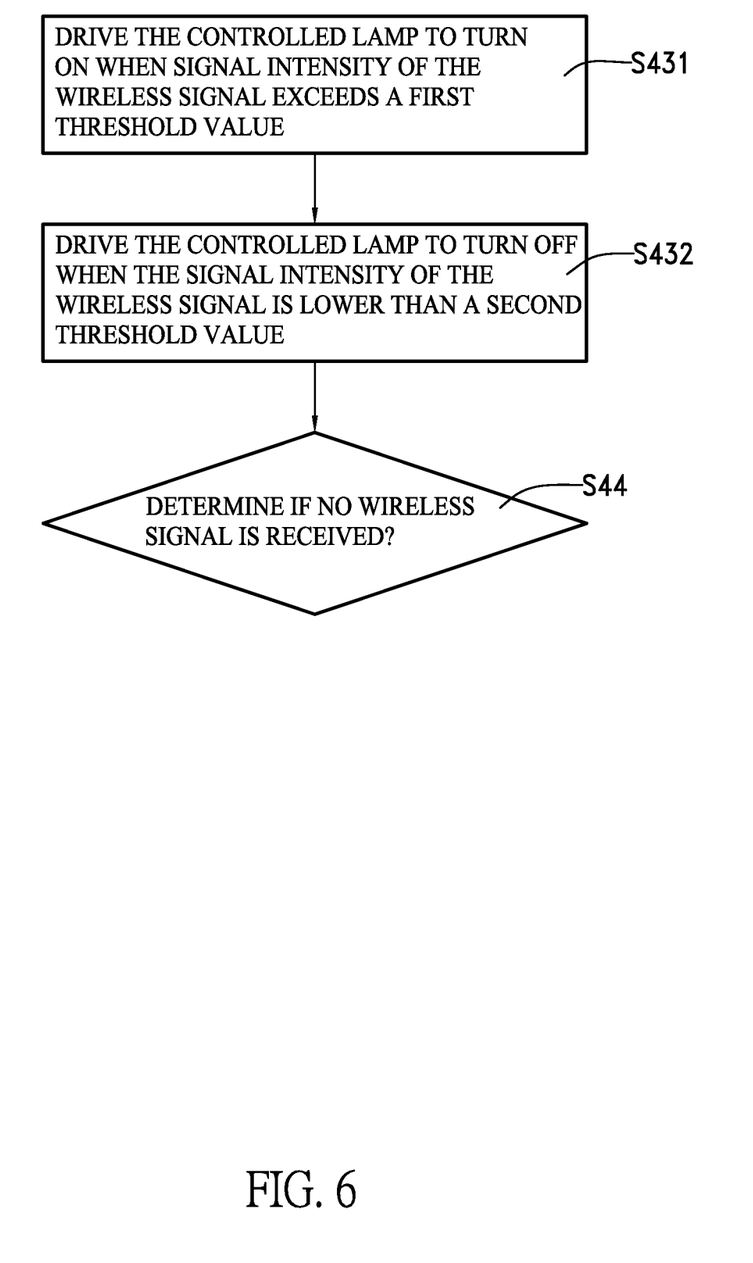
FIG. 6 is a flow diagram of step S43 of the method in FIG. 5.

With reference to FIG. 6, step 43 further has the following steps.

Step 431: Drive the controlled lamp 30 to turn on through the lamp control switch 20 when signal intensity of the wireless signal exceeds a first threshold value.

Step 432: Drive the controlled lamp 30 to turn off through the lamp control switch 20 when the signal intensity of the wireless signal is lower than a second threshold value.

Given the foregoing method, when moving in different environments, users just need to use the mobile device 10 to continuously transmit the wireless signal, such that the controlled lamp 30 is automatically turned on when the mobile device approaches the lamp control switch 20. Such automatic lamp switching control ensures less impact on the environment, lower false detection rate, enhanced operational convenience, energy conservation and carbon reduction.

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is claimed is:

1. A method for wirelessly switching lamps over short distances, the method performed by a control system having a mobile device, a lamp control switch and a controlled lamp and comprising steps of:
   positioning the mobile device at a location proximate to the lamp control switch for a first communication module built in the mobile device to continuously transmit a wireless signal to the lamp control switch according to a communication protocol;
   receiving the wireless signal through a second communication module built in the lamp control switch according to the communication protocol;
   turning on or turning off the controlled lamp according to a status of the wireless signal through the lamp control switch, wherein the controlled lamp is turned off through the lamp control switch when signal intensity of the wireless signal is lower than a second threshold value;
   determining if no wireless signal is received by the lamp control switch;
   starting counting time until a wait time is reached when determining that no wireless signal is received by the lamp control switch; and
   turning off the controlled lamp.

2. The method as claimed in claim 1, wherein the step of turning on or turning off the controlled lamp according to the status of the wireless signal has a step of driving the controlled lamp to turn on through the lamp control switch when signal intensity of the wireless signal exceeds a first threshold value.

3. The method as claimed in claim 1, wherein the step of turning on or turning off the controlled lamp according to the status of the wireless signal has a step of driving the controlled lamp to turn off the controlled lamp through the lamp control switch when signal intensity of the wireless signal is lower than a first threshold value.

4. The method as claimed in claim 1, further comprising a step of driving the controlled lamp to turn off after expiration of the wait time when no wireless signal is received by the lamp control switch.

5. The method as claimed in claim 2, further comprising a step of driving the controlled lamp to turn off after expiration of the wait time when no wireless signal is received by the lamp control switch.

6. The method as claimed in claim 3, further comprising a step of driving the controlled lamp to turn off after expiration of the wait time when no wireless signal is received by the lamp control switch.

7. The method as claimed in claim 1, wherein the communication protocol is a WiFi (Wireless Fidelity) protocol or a Bluetooth® protocol.

8. The method as claimed in claim 2, wherein the communication protocol is a WiFi protocol or a Bluetooth® protocol.

9. The method as claimed in claim 3, wherein the communication protocol is a WiFi protocol or a Bluetooth® protocol.

10. The method as claimed in claim 4, wherein the communication protocol is a WiFi protocol or a Bluetooth® protocol.

11. The method as claimed in claim 5, wherein the communication protocol is a WiFi protocol or a Bluetooth® protocol.

12. The method as claimed in claim 6, wherein the communication protocol is a WiFi protocol or a Bluetooth® protocol.

13. A control system for wirelessly switching lamps over short distances, comprising:
   a mobile device having a first communication module continuously transmitting a wireless signal according to a communication protocol;
   at least one lamp control switch, each having a second communication module receiving the wireless signal according to the communication protocol and transmitting a drive signal according to a status of the wireless signal; and
   at least one controlled lamp connected to the respective lamp control switch for the respective lamp control switch to turn on or off the at least one controlled lamp according to the drive signal transmitted from the respective lamp control switch;
   wherein when the signal intensity of the wireless signal received by one of the at least one lamp control switch exceeds a first threshold value, the lamp control switch turns on a corresponding controlled lamp;
   when the signal intensity of the wireless signal received by the lamp control switch is less than the first threshold value or a second threshold value, the lamp control switch turns off the controlled lamp; and
   when no wireless signal is received by the lamp control switch, the lamp control switch drives the controlled lamp to turn off after expiration of a wait time.

14. The control system as claimed in claim 13, wherein each of the first communication module and the second communication module is one of a WiFi (Wireless Fidelity) module and a Bluetooth® module.

* * * * *